T. M. FELL.
Process of Separating the Various Constituents of Fats, &c.

No. 167,607. Patented Sept. 14, 1875.

Witnesses;
Charles L. Barritt
R. Rowley

Inventor;
Thomas M. Fell

UNITED STATES PATENT OFFICE.

THOMAS M. FELL, OF BROOKLYN, NEW YORK, ASSIGNOR TO GEORGE B. RIPLEY, TRUSTEE.

IMPROVEMENT IN PROCESSES OF SEPARATING THE VARIOUS CONSTITUENTS OF FATS, &c.

Specification forming part of Letters Patent No. 167,607, dated September 14, 1875; application filed October 22, 1874.

*To all whom it may concern:*

Be it known that I, THOMAS M. FELL, of Brooklyn, Kings county, State of New York, have invented an Improved Process for Separating the Various Constituents of Oils, Fats, and Tallows, of which the following is a specification:

The nature of my said invention consists in the method or process of treating fats for the production of stearine, oleine, &c.

To enable others to understand my invention reference is had to the accompanying drawings, forming a part of this specification, the same letters of reference wherever they occur referring to similar parts.

Figure 1:
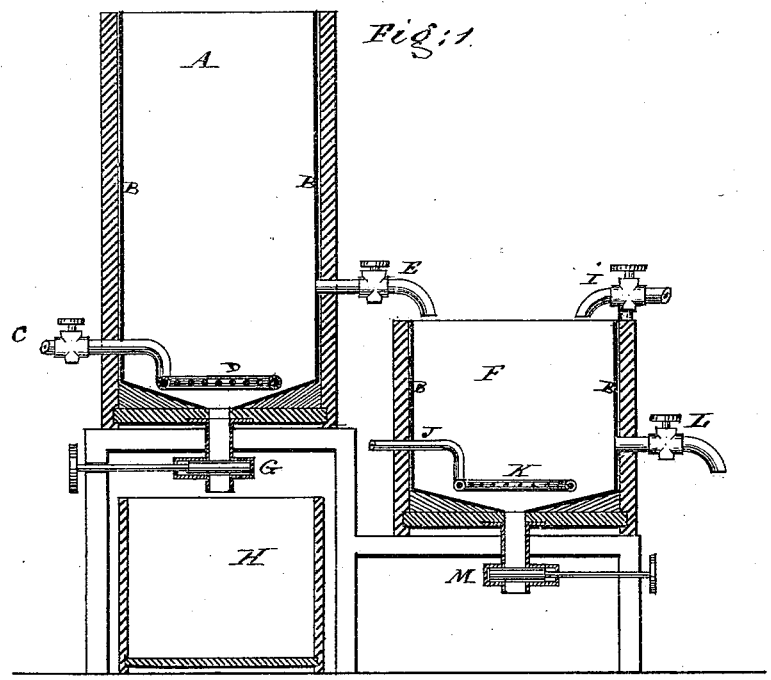
Figure 2:
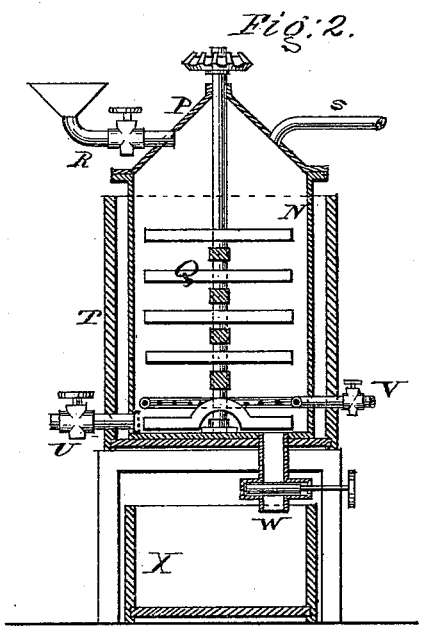

Figure 1 represents the tanks used in the first operations. Fig. 2 represents the tanks or vessels used in the second operation.

Into the tank A, having a lining of lead, B, is put about one hundred pounds of rough fat. Of course this quantity is increased in large operations as well as the other ingredients, though the proportions remain the same. To this is added, according to the quality of the fat to be treated, from two to ten per cent. of sulphuric acid, diluted in three to four times its weight of water. When the tank is thus charged the mass is subjected to about two hours steaming, by means of a current of steam admitted by the eduction-pipe C and perforated coil of pipe D in the bottom of the tank. By this operation the sulpho-compounds of the clear fat acids are produced. The steam is then shut off, and the mass allowed to settle for a few minutes. The top stratum of fat is now drawn off by the outlet-pipe E into the tank F, having also a lining of lead, B. The refuse or lower stratum, consisting of membranous matter, water, a portion of acid, and the compound of the sulpho-glycerine, is then drawn off by the outlet-pipe G into a receiver, H, as waste. From this waste product the glycerine may be extracted afterward by the processes in general use. The fats now in tank F are then treated in bulk to separate the sulpho-compounds of the fat acids. This is effected by means of a large quantity of hot water let in by the pipe I, and the mass kept well stirred for about one hour. The simple fat acids are thus deprived of the mineral acid, which sinks with the water to the bottom layer, leaving, after settling the clear fat acids, such as stearic acid, margaric acid, oleic acid, or palmatic acid, as the case may be, as a top stratum. In the tank F is arranged an induction steam-pipe, J, perforated coil K, outlet-pipe L, and a waste-water outlet-pipe, M. The steam in this tank is used only in the event of the mass cooling down below the congelation-point of the fats. The next operation consists in separating these various simple fatty acids. To do this the clear fats are drawn off by the pipe L into buckets or other suitable vessels, and filled into a metallic tank, N, Fig. 2, by the removal of the steam-fitting adjustable cover P. When the clear fats have thus been drawn off from the tank F the substratum of water and refuse mineral acid therein is now drawn off by the outlet-pipe M, thereby leaving the tank F ready for another charge. The fat acids in the metal tank N are then treated as follows: After the mass has first cooled down to about 100° or 110° Fahrenheit the agitator Q is set in motion by any suitable motor-power. Thereupon is gradually poured into the tank N, through the funnel R, (so as to avoid sudden congelation of the fat,) a quantity of petroleum-naphtha, (gravity of .70 to .75 preferred,) in the proportions according to the quality of the fats treated, as hereinafter set forth. On the introduction of the petroleum-naphtha into the tank N the valve or cock in the pipe or funnel R is closed, and the agitator kept in motion briskly for about thirty minutes, effecting thereby a perfect combination and solution of the various fatty acids. To avoid accidents from the sudden volatilization of the naphtha an open vent-pipe, S, is inserted in one side of the cover P. The temperature of the contents of the tank will be about 80° to 85° Fahrenheit.

The stirrer Q may now be stopped, and the mass left to precipitate and partially separate from the excess of petroleum-naphtha. After about four to six hours the bulk of the pure stearic or palmatic acid is precipitated. By lowering the temperature to about 65° Fahrenheit, by filling the space between the tank N and outer case T with cold water, the bulk of the margaric acid will be precipitated, leaving the oleic acid in solution with the petroleum-naphtha, which may now be drawn off by the outlet-pipe U, the strainer on the inner end preventing any escape of the precipitated fats. The oleic product thus drawn off is then treated in an ordinary still, provided with a condenser, whereby the petroleum-naphtha is vaporized and collected in the condenser, leaving the oil in the still to be drawn off separately.

To collect the stearic acid, &c., remaining in the tank N, it is melted by steam discharged into the bottom thereof by the induction-pipe and perforated coil V. The stirrer at the same time is kept in motion, thus causing the fats to run off by the outlet-pipe W into the receiving-tank X. When cooled sufficiently it is placed in suitable strainer-bags, and submitted to a slight pressing operation to partially expel the oleine and petroleum-naphtha therefrom, which product thus expressed is added to the other oleic matters before mentioned.

If the pressed solid portion still contains a small trace of petroleum-naphtha it is not objectionable for many purposes; but if its entire removal is desired it may be redistilled, or, when the saving of the naphtha is not an object, may be placed in a shallow iron caldron, and kept heated to about 200° to 250° Fahrenheit for about an hour's time, when all the petroleum-naphtha will be expelled. The product thus obtained is a pure white stearic acid, or palmatic acid, (if palm-oil has been treated,) or stearic acid mixed with margaric acid, depending entirely upon the temperature permitted for precipitation, which, by my improved process, is considerably lower than their after melting-points.

It is not necessary, except for special purposes, to expel the petroleum-naphtha entirely from the oleic product, as a small portion is rather beneficial than otherwise for use for general purposes.

For the treatment of the more oily fats or tallows that have been previously treated by other than my process, to remove the membraneous matters, &c., about five per cent. of sulphuric acid is used, diluted in about three to four times its weight of water and about twenty per cent. of petroleum-naphtha.

For the purpose of extracting the impurities and more solid portions of the oils, so as to produce a perfect and fluid oleine, two per cent. only of sulphuric acid is used, and about ten per cent. of petroleum-naphtha. For ordinary crude fats not previously rendered ten per cent. of sulphuric acid is used, diluted in water, as above, and about twenty per cent. of petroleum-naphtha.

For impure stearine found on the market two per cent. of sulphuric acid is used, with nearly an equal weight of petroleum-naphtha.

For the purpose of regulating the deposition of the more solid constituents, such as stearine, &c., from the naphtha solution, and especially in warm weather, a refrigerating-mixture of ice and water, or salt, ice, and water, is filled into the space between the vessel N and casing T surrounding it.

I am aware that under the generic name of hydrocarbon, coal distillations, spirits of turpentine, oil of schist, &c., have been used in combination with numerous other ingredients as entire processes, and that the only purpose of such coal-tar distillations, &c., was to soften the oleine before pressing. But the combination of elements in my process differs radically from such inventions, in that petroleum-naphtha is a perfect solvent of fats and oily matters, and is used in my process to hold the oily matters in perfect solution while the more solid constituents are being precipitated therefrom, either singly or together, which could not be effected by the use of coal-tar distillations, turpentine, or oil of schist, &c., as they are not capable of holding any large percentage of fats in perfect solution.

Having now described my improved process, I will proceed to set forth what I claim and desire to secure by Letters Patent of the United States—

1. The method or process of treating fats and oils for the separation of their various constituents, hereinbefore described.

2. The method or process of obtaining the separate constituents of crude animal fats, by treating the same with diluted sulphuric acid, steam, and petroleum-naphtha, at the temperatures and in the proportions of the several ingredients, and by the consecutive steps, substantially as hereinbefore set forth.

THOMAS M. FELL.

Witnesses:
  CHARLES L. BARRITT,
  CHAS. R. DURHAM.